J. W. BUTTRICK.
Corn-Planter.
No. 61,153. Patented Jan. 15, 1867.
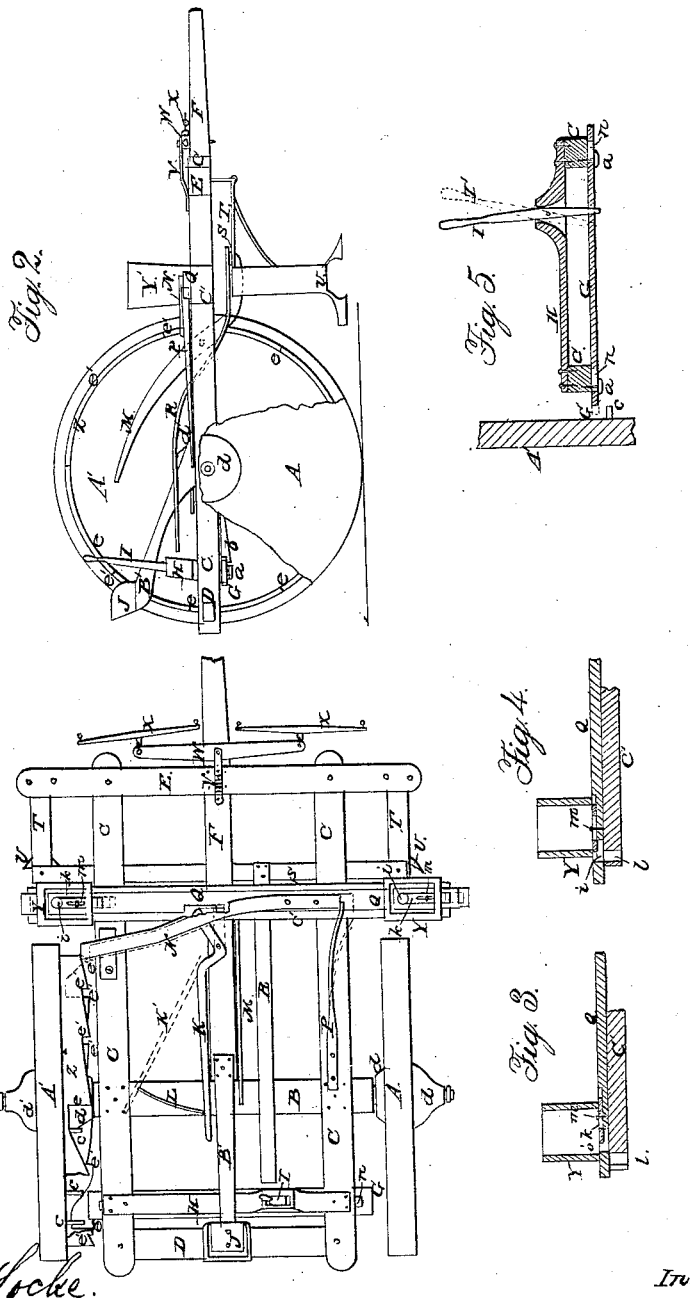

United States Patent Office.

JOHN W. BUTTRICK, OF FARMINGTON, WISCONSIN.

Letters Patent No. 61,153, dated January 15, 1867.

---

IMPROVEMENT IN SEED-PLANTERS.

---

*The Schedule referred to in these Letters Patent and making part of the same.*

---

TO ALL WHOM IT MAY CONCERN:

Be it known that I, JOHN W. BUTTRICK, of Farmington, Jefferson county, Wisconsin, have invented a new and improved Seed and Corn-Planter; and I do hereby declare that the following is a full and exact description thereof, reference being had to the accompanying drawings, in which—

Figure 1 is a top view.
Figure 2 is a side view, with one wheel broken away to show the arrangement of parts.
Figure 3 is a vertical section of feed-box, showing position of parts when not seeding.
Figure 4 is a vertical section of feed-box, showing position of parts when feeding; and
Figure 5 is a vertical section through lever I and brake G.

The nature of my invention relates to that class of seed and corn-planters that have a reciprocating instead of a rotary feed, and consists, first, in the employment on the side or inner periphery of the driving-wheel of a zigzag or ratchet-cam for driving the feeding device, so constructed as to impart to the feeding-cups or mechanism (between the points of dropping) a continuous shaking movement, to insure by agitation of the seed the filling of the cups; second, in the employment, substantially as hereinafter described, of a brake to enable the operator, when the machine fails to drop in cross-rows, to stop the driving-wheel sufficiently to make the rows to check crosswise.

To enable others skilled in the art to make and use my invention, I will proceed to describe its construction and operation.

I provide my machine with the ordinary appendages, as a tongue or pole, F, whiffle-trees W X, seat B' and J, shovels or hoes U, and support the frame C D E and C' on the axle B of the wheels A A'. One of these wheels, as A', has a zigzag or ratchet-cam, Z, that works against the end of the bar N, that is attached to and makes a part of the sliding feed-bar Q. This feed-bar works in the feed-boxes Y and Y', and is operated in one direction by the cam, and in the other the spring P, which holds the end of the part N firmly against the cam. The feed-bar has in each feed-box Y Y' a distributing cup, $i$, that can be diminished or enlarged at pleasure by means of the adjustable closing-slide K, and its retaining-screw $m$. The feed-bar Q works on the part C' of the frame, through which is an orifice, $l$, opening directly into or over the shovels or hoes U. This orifice is so adjusted with reference to the distributing cups that the latter are only in line directly over the former, and hence can only part with its measure of seed when the feed-bar is in the position shown by fig. 4, and the dotted red line in fig. 1; or, in other words, when the part N, driven by the spring P, falls into the deeper indentation $e$ of the cam Z. These deeper indentations should be equally distant apart, and their distance apart, measured on the periphery of the wheel A', should be the same as the desired distance between the rows. The other and lesser indentations $e'$ are for the purpose of shaking the feed-bar Q, thereby agitating the grain and preventing it from choking up or bridging over the cups, so insuring a great desideratum, equal and constant distribution of seed. By throwing the lever K over the stop L to the position shown by the dotted lines K', the feed-bar Q and part N are carried back to the position shown by the dotted black lines, secure from the effect or action of the cam Z, and, consequently, the machine is "out of feed." To stop the driving-wheel A' for the purpose of checking the rows, I employ the brake G, figs. 1, 2, and 4, that is retained in position and allowed only a longitudinal movement, by means of the flat-headed bolts or pins $a\ a$, that play in the slots or mortises $n\ n$. The brake G is operated by the lever I, that takes bearing in the fulcrum-piece H, and by means of which the brake G is forced against the wheel A', and between the pins or projections $c$, so causing the wheel to stop. To keep the brake away from the wheel while the machine is in use, I generally employ a spring, $b$, figs. 2 and 5. The shovels or hoes U are attached to a supporting-bar, S, and are pressed into the ground and raised out of the ground, respectively, by the levers R and M.

What I claim as new, and for which I desire Letters Patent, is—

1. The cam Z, when constructed and used substantially in the manner and for the purpose set forth.
2. The combination and arrangement of the cam Z, feed-bar Q, spring P, and part M, substantially as and for the purpose set forth.
3. The combination and arrangement of the cam Z, feed-bar Q, and shut-off lever K, substantially as and for the purpose set forth.
4. The combination of the wheel A', constructed with the cam Z, and pins $c$, and the brake G, and operating-lever I, when constructed and used substantially as and for the purpose set forth.
5. The combination and arrangement of the shovels U, and operating-bars or levers R and M, substantially as and for the purpose set forth.

JOHN W. BUTTRICK.

Witnesses:
S. D. LOCKE,
E. G. BELL.